(12) United States Patent
Toyoda

(10) Patent No.: US 8,807,181 B2
(45) Date of Patent: Aug. 19, 2014

(54) TIRE WITH FOAMED RUBBER LAYER HAVING ORGANIC FIBERS AND INORGANIC COMPOUND POWDER

(75) Inventor: Masaki Toyoda, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 1963 days.

(21) Appl. No.: 11/720,094

(22) PCT Filed: Dec. 7, 2005

(86) PCT No.: PCT/JP2005/022439
§ 371 (c)(1),
(2), (4) Date: May 24, 2007

(87) PCT Pub. No.: WO2006/062119
PCT Pub. Date: Jun. 15, 2006

(65) Prior Publication Data
US 2008/0105346 A1 May 8, 2008

(30) Foreign Application Priority Data
Dec. 7, 2004 (JP) .................................. 2004-354298

(51) Int. Cl.
*B60C 1/00* (2006.01)
*B60C 11/00* (2006.01)

(52) U.S. Cl.
USPC ..................................... 152/209.4; 152/209.7

(58) Field of Classification Search
USPC ............................................ 152/209.4, 209.7
See application file for complete search history.

(56) References Cited

U.S. PATENT DOCUMENTS

| | | | |
|---|---|---|---|
| 5,798,009 A | 8/1998 | Teratani | |
| 5,975,173 A | 11/1999 | Izumoto et al. | |
| 6,427,738 B1 * | 8/2002 | Fujino et al. | 152/209.4 |
| 6,472,461 B1 | 10/2002 | Nakamura et al. | |
| 6,489,389 B1 * | 12/2002 | Ohta et al. | 524/495 |
| 6,497,261 B1 * | 12/2002 | Fukushima et al. | 152/209.4 |
| 2002/0026003 A1 * | 2/2002 | Tahara et al. | 524/494 |
| 2003/0069345 A1 * | 4/2003 | Minagoshi et al. | 524/494 |

FOREIGN PATENT DOCUMENTS

| | | |
|---|---|---|
| EP | 0 719 658 A1 | 7/1996 |
| EP | 0 771 836 A2 | 5/1997 |
| EP | 1 048 691 A1 | 11/2000 |
| JP | 2-135241 A | 5/1990 |

(Continued)

OTHER PUBLICATIONS

Machine translation for Japan 2003-201371 (no date).*

(Continued)

*Primary Examiner* — Steven D Maki
(74) *Attorney, Agent, or Firm* — Sughrue Mion, PLLC

(57) ABSTRACT

In order to solve the various conventional problems described above, the present invention provides a tire which is excellent in a braking property and a drivability (WET performance) on a wet road surface and which sufficiently displays an edge effect or a spike effect and is excellent in an on-ice performance (surface braking and driving performance). Further, the present invention provides a tire which enhances a workability in a plant and in which micro drain ditches exhibiting a water film-removing performance are surely formed. A foamed rubber layer provided on a surface of the tire substantially brought into contact with a road surface contains at least one inorganic compound powder having a particle diameter of 10 μm or less in a range of 5 to 20 mass parts per 100 mass parts of a rubber component.

11 Claims, 2 Drawing Sheets

(56) References Cited

FOREIGN PATENT DOCUMENTS

| | | |
|---|---|---|
| JP | 4-38207 A | 2/1992 |
| JP | 9-124852 A | 5/1997 |
| JP | 09-136999 A | 5/1997 |
| JP | 9-255813 A | 9/1997 |
| JP | 10-147106 A | 6/1998 |
| JP | 11-48264 A | 2/1999 |
| JP | 2000-302914 A | 10/2000 |
| JP | 2001-072802 A | 3/2001 |
| JP | 2001-233993 A | 8/2001 |
| JP | 2001-335664 * | 12/2001 |
| JP | 2001-335664 A | 12/2001 |
| JP | 2003-201371 * | 7/2003 |
| JP | 2003-201371 A | 7/2003 |
| JP | 2005-41924 A | 2/2005 |

OTHER PUBLICATIONS

Machine translation for Japan 2001-335664 (no date).*

* cited by examiner

US 8,807,181 B2

TIRE WITH FOAMED RUBBER LAYER HAVING ORGANIC FIBERS AND INORGANIC COMPOUND POWDER

TECHNICAL FIELD

The present invention relates to a tire, for example, a pneumatic tire used for driving on ice, more specifically to a tire which is further improved in a wet skid performance (WET performance) and a braking and driving performance (on-ice performance) of a tire on an ice and snow road surface.

BACKGROUND ART

Rubber compositions for tire treads which are excellent in a wet skid performance (herein after referred to as a WET performance) related to a running stability on a wet road surface have so far been proposed. It has so far been known as techniques for enhancing a WET performance that rubber is blended with silica in a high proportion, that a glass transition temperature (Tg) of rubber, that is, 0° C. tan δ is raised and that carbon black which is crushed into pieces having a finer particle size is blended in a high proportion. However, rubber compositions for tire treads which are blended with silica in a high proportion have a problem on a workability (processability). Rubber compositions in which Tg of rubber is elevated have problems on a reduction in a low temperature performance and a rise in a rolling resistance (herein after referred to as [RRJ]). Rubber compositions in which carbon black crushed into pieces having a finer particle size is blended in a high proportion are elevated in RR.

Accordingly, a rubber composition for a tire tread which is improved in a WET performance by specific silica and a technique for kneading and a production process for the same are proposed. For example, 100 parts by weight of natural rubber and/or diene base synthetic rubber is blended with 10 to 80 parts by weight of a low temperature plasticizer having a freezing point of −48° C. or lower and 5 to 40 parts by weight of silicon carbide, silicon nitride, aluminum oxide or silica each having an average particle diameter of 0.1 to 1 mm or a mixture thereof to intend to enhance the WET performance (refer to, for example, a patent document 1). However, the problems of the workability (processability), the abrasion resistance and the low-heat property (the property with little generation of heat) remain in the above improvement.

Developments for enhancing a braking and driving performance (herein after referred to as an on-ice performance) of a tire on an ice and snow road surface have been carried out since spike tires were regulated. A water film is liable to be produced on a snow and ice road surface due to frictional heat of the snow and ice road surface with a tire. The water film reduces a frictional coefficient between the tire and the snow and ice road surface. Accordingly, a water film-removing ability on a tread of a tire, an edge effect and a spike effect exert an effect on an on-ice performance to a large extent. A water film-removing ability, an edge effect and a spike effect of a tread have to be improved in order to enhance an on-ice performance in a tire.

In order to provide a tread with a water film-removing ability, a large number of micro drain ditches (both depth and width: about 100 μm) are provided on the surface of a tire to remove a water film by these drain ditches, and a frictional coefficient of the tire on a snow and ice road surface is increased. In the above case, an on-ice performance of the tire in the beginning of use can be enhanced. However, the problem that the on-ice performance is slowly reduced as the tire is abraded is involved therein. Then, it is consider to form bubbles in a tread in order to prevent the on-ice performance from being reduced when the tire is abraded.

On the other hand, described is a method in which the micro drain ditches described above are formed on the surface of a tread by using foamed rubber blended with short fibers for the tire tread (refer to, for example, a patent document 2). In the above case, the short fibers do not readily break away from the tread when the tread is abraded by running. However, the short fibers are not approximately parallel to the abraded face in many cases, and micro drain ditches which are aimed from the beginning can not always efficiently be formed. Accordingly, the frictional coefficient on a snow and ice road surface has not sufficiently been improved. Further, there has been observed the problem that break away of the short fibers depends on running conditions and the like to a large extent to make it impossible to surely enhance the on-ice performance.

Further, it is proposed that in vulcanizing a rubber composition containing a foaming agent, organic fibers in which a viscosity is lowered than that of the composition until the temperature reaches a vulcanization maximum temperature are blended to carry out vulcanization (refer to, for example, a patent document 3). In the above case, there is the effect that micro drain ditches are formed on the surface of a tread tire to improve a water film-removing ability. However, in the case of the above tread tire of vulcanized rubber, there is room for improvement as far as a rise in an edge effect and a spike effect (scratching effect) is concerned.

Further, it is proposed to provide organic fibers with various functionalities (refer to, for example, a patent document 4). For example, it is proposed that fine particle-containing organic fibers prepared by adding fine particles having a prescribed diameter such as glass fine particles, aluminum hydroxide fine particles, alumina fine particles, iron fine particles, (meth)acrylic resin fine particles, epoxy resin fine particles and the like to organic fibers having a prescribed diameter and molding them are added to a rubber component of a tire. Further, in a rubber composition for a tire, fine particle-containing organic fibers in which a viscosity of a fiber resin is lowered more than that of the rubber matrix until a temperature of the rubber composition reaches a vulcanization maximum temperature in vulcanization are used in order to enhance a water film-removing ability and an edge effect in the tire. The water film-removing ability, an effect for elevating the frictional coefficient and the edge effect are improved by applying the fine particle-containing organic fibers. However, the above organic fibers containing fine particles have to be increased in a diameter thereof to some extent. Accordingly, this causes a reduction in the extruded skin and brings about a reduction in the plant workability, and in addition thereto, it exerts an adverse effect on a foamed layer forming micro drain ditches in extrusion.

Patent document 1: Japanese Patent Application Laid-Open No. 135241/1990
Patent document 2: Japanese Patent Application Laid-Open No. 38207/1992
Patent document 3: Japanese Patent Application Laid-Open No. 48264/1999
Patent document 4: Japanese Patent Application Laid-Open No. 233993/2001

DISCLOSURE OF THE INVENTION

Accordingly, in order to solve the various conventional problems described above, an object of the present invention is to provide a tire which is excellent in a braking property and a drivability (WET performance) on a wet road surface and which sufficiently displays an edge effect or a spike effect and is excellent in an on-ice performance (surface braking and driving performance). An other object thereof is to provide a tire which enhances a workability in a plant and in which micro drain ditches exhibiting a water film-removing performance are surely formed.

The present inventors have found that a braking property, a drivability and an on-ice performance of a tire on a wet road surface are enhanced by adding a specific inorganic compound powder having a particle diameter of 10 μm or less to a rubber composition comprising natural rubber and polybutadiene rubber which has a prescribed foaming rate when a foamed rubber layer of the rubber composition is provided on a surface substantially brought into contact with a road surface, that is, a tread surface. Further, they have found that the extruded skin in extrusion is prevented from being reduced by blending the rubber composition with not only fine particle-containing organic fibers but also organic fibers containing no fine particles in a suitable proportion in addition to the above inorganic compound powder. Also, they have found that suited use of fine particles having a larger Mohs hardness than a hardness of ice makes it possible to sufficiently display a scratching effect on the surface part of tread rubber. That is, if bubbles are formed on the rubber surface part, micro drain ditches exhibiting further an edge effect and a spike effect on the surface part by use of hard fine particles are formed. As a result thereof, they have found that the tire sufficiently displays a removing ability of a water film produced on an ice and snow road surface and that the tire is comprehensively excellent in a WET performance, an abrasion resistance, a non-ice performance and a workability. Thus, the present inventors have come to complete the present invention.

That is, the present invention has achieved the objects described above by employing the following characteristic constitutions.

(1) A tire comprising a foamed rubber layer provided on a surface substantially brought into contact with a road surface, wherein the foamed rubber layer has a foaming rate falling in a range of 3 to 50%; at least natural rubber and polybutadiene are contained in a rubber component; natural rubber is contained in a range of 20 to 70 mass parts, and polybutadiene is contained in a range of 30 to 80 mass parts each per 100 mass parts of the rubber component; carbon black is contained in a range of 5 to 55 mass parts per 100 mass parts of the rubber component; silica is contained in a range of 5 to 55 mass parts per 100 mass parts of the rubber component; and at least one inorganic compound powder having a particle diameter of 10 μm or less represented by the following Formula (I) is contained in a range of 5 to 20 mass parts per 100 mass parts of the rubber component:

M.$x$SiO$_2$.$y$H$_2$O    (I)

(M in Formula (I) is oxide or hydroxide of metal selected from Al, Mg, Ti and Ca, and x and y may be different from each other and are an integer of 0 to 10).

(2) The tire as described in the above item (1), wherein the inorganic compound powder represented by Formula (I) described above is an inorganic compound powder represented by the following Formula (II):

Al$_2$O$_3$.$m$SiO$_2$.$n$H$_2$O    (II)

(m in Formula (II) is an integer of 1 to 4, and n is an integer of 0 to 4).

(3) The tire as described in the above item (1), wherein the inorganic compound powder represented by Formula (I) described above is a powder comprising aluminum hydroxide.

(4) The tire as described in the above item (1), wherein (a) organic fibers containing no fine particles and (b) fine particle-containing organic fibers containing fine particles are contained in the rubber component in prescribed proportions.

(5) The tire as described in the above item (4), wherein (a) the organic fibers and (b) the fine particle-containing organic fibers are contained in a total amount falling in a range of 1 to 5 mass parts per 100 mass parts of the rubber component.

(6) The tire as described in the above item (4), wherein the above fine particles are contained in (b) the fine particle-containing organic fibers in a range of 5 to 50 mass parts per 100 mass parts of the resin in the whole of the above organic fibers.

(7) The tire as described in the above item (4), wherein the fine particles contained in (b) the fine particle-containing organic fibers have a Mohs hardness of 2 or more, fall in a range of 10 to 50 μm in 80 mass % or more of a frequency count in a particle diameter distribution and have an average particle diameter falling in a range of 10 to 30 g/m.

(8) The tire as described in the above item (4), wherein fibers used for (a) the organic fibers and (b) the fine particle-containing organic fibers have a diameter falling in a range of 0.01 to 0.1 mm and a length falling in a range of 0.5 to 20 mm.

(9) The tire as described in the above item (4), wherein the fine particles contained in (b) the fine particle-containing organic fibers have a frequency count of 20 mass % or more in a peak value of a particle size distribution.

(10) The tire as described in the above item (4), wherein the fine particles contained in (b) the fine particles-containing organic fibers have an aspect ratio of 1.1 or more, and corner parts are present therein.

(11) The tire as described in the above item (4), wherein the fine particles contained in (b) the fine particle-containing organic fibers are selected from inorganic fine particles and organic fine particles.

(12) The tire as described in the above item (4), wherein a resin of the organic fibers is a crystalline polymer comprising at least one selected from polyethylene and polypropylene and has a melting point of 190° C. or lower.

In the tire according to the present invention, a specific inorganic compound powder having a particle diameter of 10 μm or less is added to a rubber composition having a prescribed foaming rate on a surface substantially brought into contact with a road surface, whereby a braking property and a drivability, that is, a WET performance on a wet road surface in the tire can be enhanced, and in addition thereto, an on-ice performance thereof is improved as well. Further, addition of (a) the organic fibers and (b) the fine particle-containing organic fibers containing fine particles to the rubber composition makes it possible to suitably use the fine particle-containing organic fibers, enhances the workability in a plant and surely forms micro drain ditches exhibiting a water film-removing performance. In addition thereto, capable of being provided is a tire which sufficiently displays an edge effect or a spike effect and which is excellent as well in a non-ice performance (surface braking and driving performance).

EXPLANATION OF CODES

Figure 1:
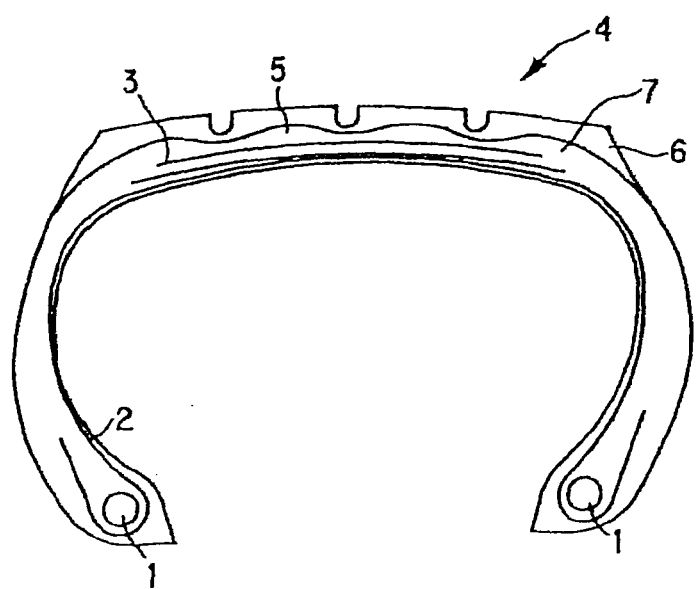
FIG. 1 is a cross-sectional outline explanatory drawing of the tire according to the present invention.

1 A pair of bead parts
2 Carcass
3 Belt
4 Tire
5 Tread
6 Cap part
6A Vulcanized rubber
12 Long bubble
13 Concave part
14 Protective layer
15 Fine particle-containing organic fibers
16 Rubber composition
17 Mouth ring
18 Spherical bubble
19 Concave part of spherical bubble
20 Fine particle
P Extrusion direction

| Explanation of Codes | |
|---|---|
| 1 | A pair of bead parts |
| 2 | Carcass |
| 3 | Belt |
| 4 | Tire |
| 5 | Tread |
| 6 | Cap part |
| 6A | Vulcanized rubber |
| 12 | Long bubble |
| 13 | Concave part |
| 14 | Protective layer |
| 15 | Fine particle-containing organic fibers |
| 16 | Rubber composition |
| 17 | Mouth ring |
| 18 | Spherical bubble |
| 19 | Concave part of spherical bubble |
| 20 | Fine particle |
| P | Extrusion direction |

BEST MODE FOR CARRYING OUT THE INVENTION

The embodiments of the present invention and examples shall be explained below in details while referring to the drawings.

Figure 2A:
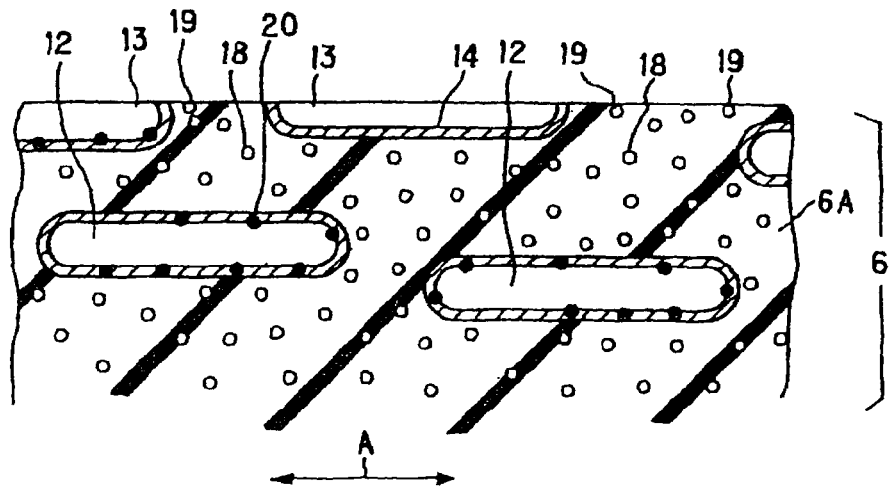
FIGS. 2 (a) and (b) are the respective cross-sectional outline drawings along a circumferential direction and a width direction in a tread part of the tire according to the present invention.
Figure 2B:
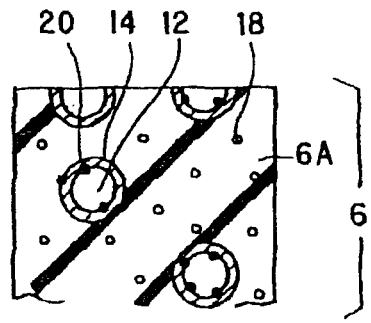
Figure 3:
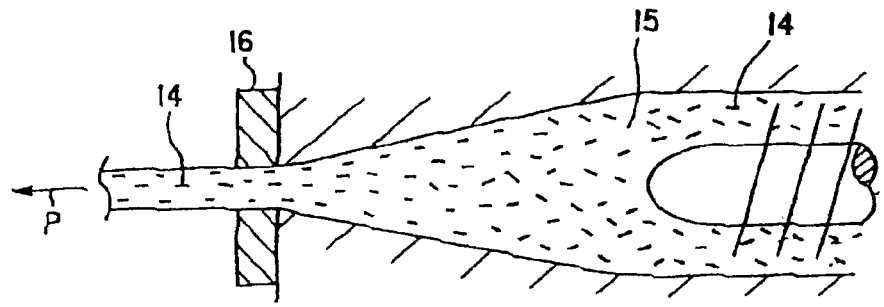
FIG. 3 is an explanatory drawing for explaining a principle to orient the fine particle-containing organic fibers in a fixed direction.

FIG. 1 is a cross-sectional outline explanatory drawing of the tire according to the present invention. FIGS. 2 (a) and (b) are the respective cross-sectional outline drawings along a circumferential direction and a width direction in a tread part of the tire according to the present invention. FIG. 3 is an explanatory drawing for explaining a principle to orient the fine particle-containing organic fibers in a fixed direction.

The tire according to the present invention comprises a tire in which a foamed rubber layer is provided on a surface substantially brought into contact with a road surface, to be specific, a pneumatic tire in which a foamed rubber layer having independent bubbles is provided, as shown in FIG. 1 to FIG. 3, on a surface of a tire tread substantially brought into contact with a road surface.

As shown in, for example, FIG. 1, assumed is a radial structure in which disposed in order are a pair of bead parts 1, a carcass 2 connected with a pair of the above bead parts 1 in toroidal form, a belt 3 fastening a crown part of the above carcass 2 and a tread comprising two layers of a cap part 6 and a base part 7. The internal structure other than the tread 5 is not different from the structure of a conventional radial tire, and therefore explanations thereof shall be abbreviated.

The surface part of the tread 5 is a foamed rubber layer formed from the rubber composition according to the present invention after vulcanized. A production process for the tire 4 shall not specifically be restricted, and it is vulcanized and molded at a prescribed temperature and a prescribed pressure by means of a prescribed mold. As a result thereof, obtained is the tire 4 having the cap tread 6 formed from the foamed rubber layer according to the present invention which is obtained by vulcanizing an unvulcanized tread.

The foamed rubber layer at the tread cap part 6A has a foaming rate falling in a range of 3 to 50%. At least natural rubber and polybutadiene are contained in the rubber component. Natural rubber is contained in a range of 20 to 70 mass parts, and polybutadiene is contained in a range of 30 to 80 mass parts each per 100 mass parts of the rubber component. Carbon black is contained in a range of 5 to 55 mass parts per 100 mass parts of the rubber component, and silica is contained in a range of 5 to 55 mass parts per 100 mass parts of the rubber component.

Further, at least one inorganic compound powder having a particle diameter of 10 μm or less represented by the following Formula (I) is contained in a range of 5 to 20 mass parts per 100 mass parts of the rubber component:

$$M.xSiO_2.yH_2O \qquad (I)$$

M in Formula (I) is oxide or hydroxide of metal selected from Al, Mg, Ti and Ca, and x and y may be different from each other and are an integer of 0 to 10.

The above foamed rubber layer shall be explained below in details.

The foamed rubber layer may contain other rubber components as long as the prescribed amounts of at least natural rubber and polybutadiene are contained in the rubber component.

Natural rubber is contained in the rubber component in a range of preferably 20 to 70 mass parts, more preferably 30 to 50 mass parts per 100 mass parts of the rubber component. Polybutadiene is contained in the rubber component in a range of preferably 30 to 80 mass parts, more preferably 50 to 70 mass parts per 100 mass parts of the rubber component. If natural rubber is contained in an amount of exceeding 70 mass parts or polybutadiene is not contained at all or contained in an amount of less than 30 mass parts, an effect is likely to be exerted on the tire performances to deteriorate the on-ice performance.

If polybutadiene is contained in an amount of exceeding 80 mass parts or natural is not contained at all or contained in an amount of less than 20 mass parts, a problem is brought about on the processability.

The other rubbers which can be added to the rubber component can suitably be selected from publicly known compounds according to the purposes. They include, for example, styrene-butadiene copolymers (SBR) and the like.

When used for a tread of a tire, the rubber component described above preferably has a glass transition temperature of −60° C. or lower. Use of the rubber component having the above glass transition temperature is advantageous in the point that the above tread and the like maintains a satisfactory rubber elasticity in a low temperature area and shows the good on-ice performance described above.

In the foamed rubber layer, publicly known carbon blacks in which the ranges of a $I_2$ adsorption amount, a CTAB specific surface area, a $N_2$ adsorption amount, a DBP adsorption amount and the like are suitably selected can be used for carbon black as long as they enhance a mechanical performance of the rubber layer and improve a processability. As far as the kind of carbon black is concerned, publicly known carbon blacks which are suitably selected such as, for example, SAF, ISAF-LS, HAF-HS and the like can be used.

In the rubber layer, carbon black is contained in a range of 5 to 55 mass parts, preferably 10 to 50 mass parts per 100 mass parts of the rubber component.

If a content of carbon black exceeds 55 mass parts, the tire performances are reduced, and an effect is exerted as well on the on-ice performance. Also when carbon black is not contained at all or contained in an amount of less than 5 mass parts, an adverse effect is exerted on the on-ice performance.

In the foamed rubber layer, silica does not represent only narrowly defined silicon dioxide and means silicic acid base fillers, and it includes, to be specific, hydrous silicic acid and silicates such as calcium silicate, aluminum silicate and the like in a.

In the rubber layer, silica is contained in a range of 5 to 55 mass parts, preferably 30 to 50 mass parts per 100 mass parts of the rubber component.

If a content of silica exceeds 55 mass parts, the tire performances are reduced, and an effect is exerted as well on the on-ice performance. Also when silica is not contained at all or contained in an amount of less than 5 mass parts, an adverse effect is exerted on the on-ice performance.

The inorganic compound powder described above has to satisfy the following condition. That is, it is at least one inorganic compound powder represented by the following Formula (I), and the above inorganic compound has to have a particle diameter of 10 μm or less.

$$M.xSiO_2.yH_2O \quad (I)$$

M in Formula (I) is oxide or hydroxide of metal selected from Al, Mg, Ti and Ca, and x and y may be different from each other and are an integer of 0 to 10. When both of x and y are 0, the inorganic compound powder represented by Formula (I) described above is oxide or hydroxide of metal selected from Al, Mg, Ti and Ca.

The specific examples of the inorganic compound represented by Formula (I) described above include alumina ($Al_2O_3$), magnesium hydroxide ($Mg(OH)_2$), magnesium oxide ($MgO_2$), titan white ($TiO_2$), titan black ($TiO_{2n-1}$), talc ($3MgO.4SiO_2.H_2O$), attapulgite ($5MgO.8SiO_2.9H_2O$) and the like. Calcium magnesium silicate ($CaMgSiO_4$) and magnesium silicate ($MgSiO_3$) exhibit as well the same effects as those of the inorganic compound according to the present invention.

The inorganic compound represented by Formula (I) described above is preferably an inorganic compound represented by the following Formula (II) or aluminum hydroxide:

$$Al_2O_3.mSiO_2.nH_2O \quad (II)$$

The term m in Formula (II) is an integer of 1 to 4, and n is an integer of 0 to 4.

The specific examples of the inorganic compound represented by Formula (I) described above include clay ($Al_2O_3.2SiO_2$), kaolin ($Al_2O_3.2SiO_2.2H_2O$), pyrophyllite ($Al_2O_3.4SiO_2.H_2O$), bentonite ($Al_2O_3.4SiO_2.2H_2O$) and the like. Aluminum hydroxide used in the present invention includes as well alumina hydrate.

The inorganic compound described above has to have a particle diameter of 10 μm or less, preferably 0.05 to 5 μm and more preferably 0.1 to 3 μm. If the inorganic compound has a particle diameter of exceeding 10 μm, the rubber for the tire tread is extremely deteriorated in rupture resistant characteristics, particularly an abrasion resistance, and therefore it is not preferred. The particularly preferred inorganic compound powders used in the present invention are clay ($Al_2O_3.2SiO_2$), aluminum hydroxide ($Al(OH)_3$) and alumina ($Al_2O_3$). The inorganic compound powder can be used alone or in a mixture of two or more kinds thereof. Inorganic compound powders which do not satisfy the conditions described above, for example, inorganic compound powders having other structures such as sulfides, sulfates and carbonates of metal selected from Al, Mg, Ti and Ca are not effective for enhancing the WET performance.

A blending amount of the inorganic compound powder used in the present invention is 5 to 20 mass parts, preferably 10 to 15 mass parts per 100 mass parts of the rubber component. If a blending amount of the inorganic compound powder is 5 mass parts or less, the WET performance can not be enhanced, and if it exceeds 20 mass parts, an adverse effect is exerted on the abrasion resistance. Accordingly, both are not preferred.

In the foamed rubber layer, (a) the organic fibers and (b) the fine particle-containing organic fibers are contained preferably in a prescribed proportion. If (b) the fine particle-containing organic fibers added to the foamed rubber layer are used, they display effects for removing water and increasing friction on a tire surface and enhance the on-ice performance. When a material having a relatively high hardness is used, as described later, for the fine particles used for (b) the fine particle-containing organic fibers, an effect is exerted on the surfaces of the vulcanized rubber and the molded article in extrusion due to relation with a diameter of the organic fibers added, and a reduction in the workability in a plant is brought about due to the above cause. Accordingly, (a) the organic fibers containing no fine particles are preferably added to the rubber layer described above in a prescribed proportion together with (b) the fine particle-containing organic fibers.

The above proportion falls in a range of preferably 98/2 to 2/98, particularly preferably 95/5 to 5/95 in terms of a proportion of (a) the organic fibers/(b) the fine particle-containing organic fibers.

In the present invention, the total amount of (a) the organic fibers and (b) the fine particle-containing organic fibers each described above which are added to the rubber layer falls in a range of preferably 1 to 5 mass parts, particularly preferably 1.5 to 3 mass parts per 100 mass parts of the rubber component.

If the total amount thereof is less than 1 mass part, an effect of blending the fibers can not sufficiently be exhibited, that is, the scratching effect is not sufficiently exhibited, and an edge effect or a spike effect and an on-ice performance corresponding thereto in a tread of the tire are not observed to be sufficiently improved. On the other hand, if the blending amount thereof exceeds 5 mass parts, the extrusion workability is deteriorated to bring about skin roughening, and inconveniences such as cracks are caused in a certain case in the vulcanized rubber and a tread of the tire. Accordingly, it is not preferred.

Organic fibers in which a material, a form, a diameter, a length and the like are the same do not necessarily have to be used at the same time for the organic fibers used for (a) the organic fibers and (b) the fine particle-containing organic fibers, and organic fibers which are different from each other may be used. Organic fibers having properties falling in the following ranges are preferably used.

Materials used for (a) the organic fibers and (b) the fine particle-containing organic fibers shall not specifically be restricted and can suitably be selected according to the purposes. As described above, however, it is preferred in the present invention from relation with the rubber component to use a resin having a viscosity characteristic which is lowered more than a viscosity of a rubber matrix in the rubber component until it reaches a vulcanization maximum temperature in vulcanization. That is, the organic fiber resin has the thermal characteristic that it is molten (including softened) until the rubber composition reaches a vulcanization maximum temperature.

If the organic fiber resin has the above thermal characteristic, the long bubbles described above which can function as micro drain ditches can readily be formed in the vulcanized rubber obtained by vulcanizing the rubber composition.

The vulcanization maximum temperature means a maximum temperature which is reached by the rubber composition in vulcanization thereof. In the case of, for example, mold vulcanization, it means a maximum temperature which is reached by the above rubber composition until the above rubber composition comes out from a mold and is cooled since it gets into the mold. The vulcanization maximum temperature can be measured by, for example, inserting a thermocouple into the rubber composition. A viscosity of the rubber matrix means a fluid viscosity and is measured by means of, for example, a corn rheometer, a capillary rheometer and the like. A viscosity of the resin described above means a melt viscosity and is measured by means of, for example, a corn rheometer, a capillary rheometer and the like.

Accordingly, the preferred resin selected in the present invention particularly suitably includes, for example, a crystalline high molecular resin having a lower melting point than the vulcanization maximum temperature described above.

The larger the difference between a melting point of the crystalline high polymer and a vulcanization maximum temperature of the rubber composition is, the more quickly the crystalline high polymer is molten during vulcanization of the rubber composition, and therefore timing in which a viscosity of the high polymer is lowered more than a viscosity of the rubber matrix is expedited. Accordingly, when the high polymer is molten, gas generated from a foaming agent blended with the rubber composition comes together in the inside of the high polymer having a lower viscosity than that of the rubber matrix. As a result thereof, bubbles having a resin layer containing fine particles in a boundary with the rubber matrix, that is, capsule-shaped long bubbles covered with the resin are efficiently formed in the vulcanized rubber in the state they are not collapsed.

In the foamed rubber layer which is a tire tread, the above capsule-shaped long bubbles come out on the surface of the tread, and grooves produced by friction. The grooves function as the micro drain ditches and sufficiently exhibit an edge effect and a spike effect as well as a water film-removing effect.

In contrast with this, if the resin of the organic fibers has a melting point close to a vulcanization maximum temperature of the rubber composition, the resin is not quickly molten in the beginning of vulcanization and molten in the end of vulcanization. A part of gas present in the rubber composition is introduced into the vulcanized rubber matrix in the end of vulcanization, and it does not come together in the inside of the molten resin. As a result thereof, the long bubbles described above which function effectively as the micro drain ditches are not efficiently formed. On the other hand, if the resin of the organic fibers has a too low melting point, fusion between the organic fibers is caused in blending the rubber composition with the organic fibers and kneading them, and inferior dispersion of the organic fibers is brought about. This prevents as well the long bubbles described above which can function as the micro drain ditches from being efficiently formed. Accordingly, a melting point of the resin in the organic fibers is selected preferably in a range in which the resin is not softened and molten at temperatures in the respective steps before vulcanization and in which the viscosities of the rubber matrix and the resin are reversed during a vulcanization step.

An upper limit in a melting point of the organic fiber resin shall not specifically be restricted and is preferably selected considering the points described above, and it is preferably lower than a vulcanization maximum temperature of the rubber matrix, more preferably lower by 10° C. or more and particularly preferably lower by 20° C. or more. An industrial vulcanization temperature of the rubber composition is usually about 190° C. at the highest. When the vulcanization maximum temperature is set to, for example, a temperature exceeding 190° C., a melting point of the resin is selected in a range of 190° C. or lower, and it is preferably 180° C. or lower, more preferably 170° C. or lower.

A melting point of the resin can be measured by means of a publicly known measuring device and the like, and, for example, the melting peak temperature measured by means of a DSC measuring device can be set to the melting point described above.

The resin of the organic fibers may be formed from a crystalline high polymer and/or a non-crystalline high polymer. In the present invention, however, it is formed preferably, as described above, from an organic material containing a lot of a crystalline high polymer and formed more preferably only from a crystalline high polymer in terms of the points that a change in the viscosity takes place suddenly at some temperature because of the presence of phase transition and that the viscosity is easily controlled.

The specific examples of the above crystalline high polymer include, for example, polymers comprising single compositions such as polyethylene (PE), polypropylene (PP), polybutylene, polybutylene succinate, polyethylene succinate, syndiotactic 1,2-polybutadiene (SPB), polyvinyl alcohol (PVA), polyvinyl chloride (PVC) and the like. Also, copolymers thereof and polymers obtained by blending the above polymers to control melting points to suitable ranges can be used as well. Further, polymers obtained by adding additives to the above polymers can be used as well. Among the above crystalline high polymers, polyolefins and polyolefin copolymers are preferred, and polyethylene (PE) and polypropylene (PP) are more preferred in terms of the point that they are generally used and readily available. Polyethylene (PE) is particularly preferred in terms of the points that it has a relatively low melting point and that handling thereof is easy.

The non-crystalline high polymer includes, for example, polymethyl methacrylate (PMMA), acrylonitrile-butadiene-styrene copolymers (ABS), polystyrene (PS), polyacrylonitrile, copolymers thereof and blended polymers thereof. They may be used alone or in combination of two or more kinds thereof.

The organic fibers of (a) the organic fibers and (b) the fine particle-containing organic fibers used in the present invention have a fiber length falling in a range of preferably 0.5 to 20 mm, particularly preferably 1 to 10 mm.

If the organic fibers having the length described above are present in the vulcanized rubber in forming the foamed rubber layer, the edge effect and the spike effect work effectively. Further, addition of a foaming agent described later makes it possible to sufficiently form long bubbles which can efficiently function as the micro drain ditches. If the organic fibers have a length of less than 0.5 mm, the effects can not sufficiently be displayed. On the other hand, if the organic fibers have a length of exceeding 20 mm, the organic fibers are entangled, and a dispersibility thereof tends to be reduced.

In the organic fibers, a diameter of the fibers falls in a range of preferably 0.01 to 0.1 mm, particularly preferably 0.015 to 0.09 mm. If the organic fibers have a diameter of less than 0.01 mm, cutting is liable to be caused, and therefore the edge effect or the spike effect can not sufficiently be exhibited. On the other hand, if the organic fibers have a diameter of exceeding 0.1 mm, a problem is brought about on the processability.

In (b) the fine particle-containing organic fibers, fine particles contained in the organic fibers described above include inorganic fine particles and organic fine particles. To be specific, the inorganic fine particles include glass fine particles, aluminum hydroxide fine particles, alumina fine particles, iron fine particles and the like. The organic fine particles include, for example, (meth) acrylic resin fine particles, epoxy resin fine particles and the like. They may be used alone or in combination of two or more kinds thereof. Among them, the inorganic fine particles are preferred in terms of the point that they are excellent in a scratching effect on ice.

The fine particles used in the present invention have a hardness of preferably 2 or more, particularly preferably 5 or more in terms of a Mohs hardness. If a Mohs hardness of the fine particles is not lower than a hardness (1 to 2) of ice, that is, 2 or more, a higher scratching effect of the tread can be displayed on the surface part of the foamed rubber layer. Accordingly, the tire obtained has a large frictional coefficient on an ice and snow road surface and is excellent in an on-ice performance (surface braking and driving performance of the tire on an ice and snow road surface).

The above fine particles having a high hardness include, for example, gypsum, calcite, fluorite, orthoclase, quartz, garnet and the like, and they include preferably silica glass (hardness: 6.5), quartz (hardness: 7.0), fused alumina (hardness: 9.0) and the like each having a Mohs hardness of 5 or more. Among them, silica glass, alumina (aluminum oxide) and the like are inexpensive and can readily be used.

The fine particles described above fall in a range of 10 to 50 µm in 80 mass % or more, preferably 90 mass % or more of a frequency count in a particle diameter distribution and have an average particle diameter falling in a range of preferably 10 to 30 µm.

If the particle diameter in the frequency count described above is lower than 10 µm, it is observed that the particles are liable to be coagulated in producing (b) the fine particle-containing organic fibers, and a dispersibility thereof tends to be reduced. Further, a tire prepared by using the above fiber scan not exhibit as at is factory scratching effect, edge effect and spike effect. On the other hand, if the particle diameter described above exceeds 50 µm, problems such as cutting of the fibers and the like take place frequently in producing (b) the fine particle-containing organic fibers, and (b) the desired fine particle-containing organic fibers are not efficiently obtained.

The fine particles have a frequency count of preferably 20 mass % or more, more preferably 25 mass % or more and further preferably 30 mass % or more in a peak value of a particle size distribution.

If the frequency count in the peak value is 20 mass % or more, a particle size distribution curve of the fine particles is sharpened, and the particle diameters are uniformized. Accordingly, the good fibers which are less liable to cause cutting in spinning the fine particle-containing organic fibers are obtained. When the above fibers are used for a tire, the on-ice performance is stabilized. In contrast with this, if the frequency count in the peak value is less than 20 mass %, cutting is liable to be caused in spinning the fibers. Further, the tire is liable to be scattered in performances. In the particle diameter falling in the range described above, the larger the particle diameter is, the more the on-ice performance is improved.

In the above case, the frequency count shows a mass rate of the particles present in the divided width based on the whole particle mass when a particle diameter in the particle size distribution (particle size distribution curve) is divided by a divided width of 2 µm. The frequency count in the peak value shows a frequency count in a divided width in which a maximum peak value is included in the particle size distribution curve.

Further, the fine particles have an aspect ratio of preferably 1.1 or more, and corner parts are preferably present therein. The aspect ratio is more preferably 1.2 or more, further preferably 1.3 or more. In this respect, the presence of the corner parts means that the whole surface is not a spherical surface or a smooth curved surface.

Fine particles having corner parts from the beginning can be used as well for the fine particles according to the present invention. Fine particles in which corner parts are allowed to be present by crushing if they are spherical can be used as well, and more corner parts can be allowed to be present.

The form of the fine particles can be confirmed by observing a fine particle group thereof under an electron microscope, and it is confirmed that they are not spherical. If the aspect ratio showing a ratio of a major axis to a minor axis is 1.1 or more, corner parts formed on the particle surface can sufficiently be angulated. Accordingly, a scratching effect, an edge effect and a spike effect can sufficiently be enhanced in a tire using the fine particle-containing organic fibers containing the above fine particles.

The fine particles are contained in a range of preferably 5 to 50 mass parts, particularly preferably 7 to 50 mass parts per 100 mass parts of the resin which forms the fine particle-containing organic fibers.

If an amount of the fine particles is less than 5 mass parts, a scratching effect in the rubber products of the rubber composition and an edge effect and a spike effect in the tread of the tire are not sufficiently displayed in a certain case. On the other hand, if an amount of the fine particles exceeds 50 mass parts, problems such as cutting of the fibers and the like take place frequently in producing the fine particle-containing organic fibers, and it is likely that the fine particle-containing organic fibers are not efficiently obtained.

In the present invention, the vulcanized rubber before molding the foamed rubber layer is blended with a foaming agent in order to form bubbles after vulcanization. Micro drain ditches having long bubbles are formed in the vulcanized rubber or the foamed rubber layer which becomes the tread by using the foaming agent and the fibers described above, and it is provided with a water film-removing ability.

The foaming agent includes, for example, dinitrosopentamethylenetetramine (DPT), azodicarbonamide (ADCA), dinitrosopentastyrenetetramine, benzenesulfonylhydrazide derivatives, oxybisbenzenesulfonylhydrazide (OBSH), ammonium bicarbonate generating carbon dioxide, sodium bicarbonate, ammonium carbonate, nitrososulfonylazo compounds generating nitrogen, N,N'-dimethyl-N,N'-dinitrosophthalamide, toluenesulfonylhydrazide, p-toluenesulfonylsemicarbazide, p,p'-oxy-bis(benzenesulfonylsemicarbazide) and the like.

Among the above foaming agents, dinitrosopentamethylenetetramine (DPT) and azodicarbonamide (ADCA) are preferred considering the production processability, and azodicarbonamide (ADCA) is particularly preferred. They may be used alone or in combination of two or more kinds thereof.

The action of the foaming agent turns the vulcanized rubber obtained into foamed rubber having a high foaming rate.

In the present invention, a foaming auxiliary agent is used as other components from the viewpoint of carrying out efficient foaming, and it is preferably used in combination with the foaming agent. The foaming auxiliary agent includes, for example, auxiliary agents which are usually used for producing foamed products, such as urea, zinc stearate, zinc benzenesulfinate, zinc oxide and the like. Among them, urea, zinc stearate, zinc benzenesulfinate and the like are preferred. They may be used alone or in combination of two or more kinds thereof.

A content of the foaming agent may suitably be determined according to the purposes, and it is preferably 1 to 10 mass parts per 100 mass parts of the rubber component. The foaming agent may be blended in the rubber matrix or may be blended in the respective organic fibers.

The other components used in the present invention can be used as long as the effects of the present invention are not damaged, and capable of being suitably selected according to the purposes and used are, for example, vulcanizing agents such as sulfur and the like, vulcanization accelerating agents such as dibenzothiazyl disulfide and the like, vulcanization accelerating auxiliary agents, sulfurization inhibitors such as N-cyclohexyl-2-benzothiazyl-sulfeneamide, N-oxydiethylene-benzothiazyl-sulfeneamide and the like, ozone deterioration inhibitors, colorants, antistatic agents, dispersants, lubricants, antioxidants, softening agents, inorganic fillers such as carbon black and silica and in addition thereto, various blending agents which are usually used in the rubber industry. They may be used alone or in combination of two or more kinds thereof, and commercial products may be used.

The rubber composition described above in details is kneaded, heated and extruded by the following conditions and method to form the foamed rubber layer in the tire according to the present invention.

In kneading, various conditions of a kneading equipment and the like such as a volume put into a kneading equipment, a rotor revolving speed, a kneading temperature, a kneading time and the like shall not specifically be restricted and can suitably be selected according to the purposes. Commercial equipments can suitably be used as the kneading equipment.

In heating or extruding, various conditions such as a heating or extruding time, a heating or extruding equipment and the like shall not specifically be restricted and can suitably be selected according to the purposes. Commercial equipments can suitably be used as the heating or extruding equipment. The heating or extruding temperature is suitably selected, when the foaming agent is present, in a range in which it is not foamed. The extruding temperature is preferably 90 to 100° C.

In the present invention, the organic fibers described above are oriented preferably in an extrusion direction by extrusion. A fluidity of the rubber composition is controlled in a limited temperature range in order to carry out effectively the above orientation. To be specific, a plasticizer such as aroma base oil, naphthene base oil, paraffin base oil and ester base oil and/or a processability improving agent such as a liquid polymer including liquid polyisoprene rubber and liquid polybutadiene rubber are suitably added to the rubber composition to change a viscosity of the rubber composition, whereby the fluidity thereof is enhanced.

When the organic fibers are added in the present invention, (a) the organic fibers and (b) the fine particle-containing organic fibers are oriented preferably in a direction parallel to a ground plane in a tread, that is, in a peripheral direction of the tire in producing the foamed rubber layer in the tread. A drainage of the tire in a running direction can be enhanced, and the on-ice performance can effectively be improved.

In a method for orienting the respective organic fibers in line in the foamed rubber layer, the rubber composition 16 containing the fine particle-containing organic fibers 15 is extruded, as shown in, for example, FIG. 4, from a mouth ring 17 of an extruding machine in which a cross-sectional area of a flow channel is reduced toward an outlet, whereby the fine particle-containing organic fibers 15 and the like can be oriented in a fixed direction. In the above case, a longitudinal direction of the fine particle-containing organic fibers 15 and the like contained in the rubber composition 16 before extruded is gradually lined up along an extruding direction (arrow P direction) in a step in which the rubber composition is extruded to the mouth ring 17. When extruded from the mouth ring 17, the longitudinal direction thereof can almost completely be oriented in the extruding direction (arrow P direction). The degree of orientation in the fine particle-containing organic fibers 15 and the like in the rubber composition 16 in the above case is changed by a reduction in a cross-sectional area of the flow channel, an extruding speed, a viscosity of the rubber composition 16 before vulcanized and the like.

In the present invention, the vulcanizing conditions and the method shall not specifically be restricted and can suitably be selected according to the kind of the rubber components and the like. Mold vulcanization is preferred when producing the foamed rubber layer in the tread as is the case with the present invention. The vulcanizing temperature is preferably selected so that a vulcanization maximum temperature of the rubber composition described above during vulcanization is higher, as described above, than a melting point of the resin constituting the organic fibers. If the vulcanization maximum temperature is lower than a melting point of the resin, the fibers are not molten as described above, and gas produced by foaming can not be introduced into the resin. Long bubbles can not efficiently be formed in the foamed rubber layer. The vulcanizing equipment shall not specifically be restricted, and commercial equipments can suitably be used.

In the tread (foamed rubber layer) in the tire of the present invention, concave parts of long bubbles produced on the surface of the tread are provided with directionality. This allows the concave parts to function as drainage channels which carry out efficient drainage. The above concave parts have the protective layer described above, particularly the protective layer in which the fine particles are present, and therefore the above concave parts are excellent in a peeling resistance, a water channel form-holding property, a water channel edge part-abrading property, a water channel-holding property in applying a load and the like. Further, in the tire of the present invention, long bubbles are present in the whole part of the foamed rubber layer, so that various functions are exhibited by the above concave parts from the beginning of use to the terminal stage, and the tire is excellent in an on-ice performance.

A foaming rate in the foamed rubber layer falls in a range of preferably 3 to 50%, particularly preferably 15 to 40%.

If the foaming rate is less than 3%, the concave parts in the tread are reduced in a volume, and the on-ice performance can not sufficiently be displayed. On the other hand, if the foaming rate exceeds 50%, the on-ice performance described above in the tread is satisfactory, but bubbles in the tread are increased, and the destructive limit tends to be reduced, so that it is not preferred in terms of the durability. The foaming rate Vs means the whole foaming rate in the vulcanized rubber or the tread and can be calculated from the following equation:

$$Vs=(\rho_0/\rho_1-1)\times100(\%)$$

wherein $\rho_1$ represents a density (g/cm$^3$) of the vulcanized rubber (foamed rubber), and $\rho_0$ represents a density (g/cm$^3$) of a solid phase part in the vulcanized rubber (foamed rubber). A density of the rubber (foamed rubber) after vulcanized and a density of the solid phase part in the rubber (foamed rubber) after vulcanized were calculated, for example, from a mass measured in ethanol and a mass measured in the air.

In the present invention, long bubbles formed in the foamed rubber layer have an average diameter (μm) of preferably 10 to 500 μm. If the average diameter described above is less than 10 μm, micro drain ditches formed on the surface of the rubber are reduced in a water removing performance. If the average diameter described above exceeds 500 μm, the rubber is deteriorated in a cutting resistance and a block defect and worsened in an abrasion resistance on a dry road surface in a certain case.

The tire according to the present invention can suitably be used not only for so-call passenger cars but also various vehicles such as trucks, buses and the like. It can suitably be used for structures in which slip on an ice and snow road surface has to be inhibited. The tread of the tire can be used for treads for retreading tires, solid-core tires and the like. When the tire is a pneumatic tire, inert gas such as nitrogen and the like in addition to air can be used as gas charged into an inside thereof.

In the embodiments described above, the example of the tread having a two layer structure has been explained, but the structure of the tread shall not specifically be restricted and may be a single layer structure. Further, it may be a multilayer structure in which the tread is divided in a tire radius direction and a structure in which the tread is divided in a tire peripheral direction or a tread width direction. At least a part of a surface layer of the tread is preferably constituted by the rubber composition of the present invention.

EXAMPLES

The examples of the present invention shall be explained below, but the present invention shall by no means be restricted by these examples.

Examples 1 to 9 and Comparative Examples 1 to 7

In order to form foamed rubber layers in the respective examples and comparative examples, blended were natural rubber, cis-1,4-polybutadiene (trade name: UBEPOL 150 L, manufactured by Ube Industries, Ltd.), carbon black (N134 ($N_2SA$: 146 m$^2$/g), manufactured by Asahi Carbon Co., Ltd.), silica (Nipsil AQ, manufactured by Nippon Silica Industry Co., Ltd.), a silane coupling agent (Si69, manufactured by Degussa AG.), aroma oil, stearic acid, an antioxidant (N-isopropyl-N'-phenyl-p-phenylenediamine), zinc oxide, a vulcanization accelerating agent (MBTS: dibenzothiazyl disulfide), a vulcanization accelerating agent (CBS: N-cyclohexyl-2-benzothiazolesulfeneamide), sulfur, a foaming agent (DNPT: dinitropentamethylenetetramine), urea and aluminum hydroxide (Higilite H-43: particle diameter 5 μm or less, manufactured by Showa Denko K. K.) or pentonite ($Al_2O_3.4SiO_2.H_2O$: particle diameter 5 μm or less). Further, (a) the organic fibers and (b) the fine particle-containing organic fibers were blended suitably selecting the amounts thereof and a (a)/(b) ratio. The blending amounts thereof are shown in the following Tables 1 and 2. The fine particle of (b) the fine particle-containing organic fibers is fused alumina having a hardness of 9.

The respective rubber compositions in blends shown in Table 1 and Table 2 were vulcanized while measuring a vulcanization temperature by inserting a thermocouple into the rubber compositions in vulcanization. The vulcanization temperature exceeded the melting points of the respective organic fiber resins until it reached a vulcanization maximum temperature, and a viscosity of the resin described above was lowered more then a viscosity of the rubber matrix in vulcanization of the rubber compositions described above.

A viscosity (melt viscosity) of the respective organic fiber resins in the vulcanization maximum temperature described above was measured (when a torque of the rubber reached Max, measurement was finished to set the torque to a viscosity of the rubber, and a change in the torque and a change in the foaming pressure were measured) by means of a corn rheometer to find that it was 6. On the other hand, a viscosity (flow viscosity) of the rubber compositions described above in the vulcanization maximum temperature described above was measured by providing a fixed amplitude input of 100 cycles/minute by means of a corn rheometer model 1-C manufactured by Monsanto Co., Ltd. while changing the temperature to measure a torque with the passage of time, and the minimum torque value thereof was set to the viscosity (dome pressure: 0.59 MPa, holding pressure: 0.78 MPa, closing pressure: 0.78 MPa, swing angle: ±5°) to find that it was 11.

Treads (foamed rubber layers) for a tire were formed in the respective examples and comparative examples to produce tires for the respective tests according to usual tire production conditions.

<On-Ice Performance>

The tire was a radial tire for a passenger car, and a tire size thereof was 185/70R13. Four tires were mounted on a domestically produced passenger car of a 1600 cc class, and an on-ice braking performance of the above passenger car at an ice temperature of −1° C. was confirmed. A tire prepared in Comparative Example 1 was set to a control tire, and the on-ice performance was expressed by (braking distance of the control tire/braking distance of the tires prepared in the other examples)×100.

<Wet Performance>

Braking distances at the initial speeds of 40, 60 and 80 km/hour were measured on a wet asphalt road surface, wherein the braking distances of the control tire prepared in Comparative Example 1 were set to 100 at the respective initial speeds, and the values of the other tires were turned into indices by (braking distance of the tire prepared in Comparative Example 1/braking distance of the test tire)×100 to express the WET performance by an index of an average value of the braking distances at the tree initial speeds. Accordingly, the larger the numeral value is, the better the WET performance is.

<Abrasion Resistance>

The car was allowed to travel 10,000 km on a metalled road, and then the remaining grooves were measured. Travel distances required for the treads to be abraded by 1 mm were relatively compared, wherein the travel distance in Comparative Example 1 was set to 100 (corresponding to 8,000 km/mm), and the travel distances in the other examples were expressed by indices. It is shown that the larger the index is, the better the abrasion resistance is.

The results thereof are shown in Tables 1 and 2.

TABLE 1

| | combination thing (mass part) | Example | | | | | | | | |
|---|---|---|---|---|---|---|---|---|---|---|
| | | 1 | 2 | 3 | 4 | 5 | 6 | 7 | 8 | 9 |
| combination | Natural rubber | 70 | 70 | 70 | 50 | 20 | 50 | 50 | 70 | 70 |
| | Cis-1,4-polybutadiene rubber | 30 | 30 | 30 | 50 | 80 | 50 | 50 | 30 | 30 |
| | Carbon black | 55 | 55 | 55 | 30 | 55 | 55 | 5 | 5 | 5 |
| | Silica | 5 | 5 | 5 | 30 | 5 | 5 | 55 | 55 | 55 |
| | Silane coupling agent | 0.5 | 0.5 | 0.5 | 3.0 | 0.5 | 0.5 | 5.5 | 5.5 | 5.5 |
| | Aroma oil | 15 | 15 | 15 | 15 | 15 | 15 | 15 | 15 | 15 |
| | Stearic acid | 2 | 2 | 2 | 2 | 2 | 2 | 2 | 2 | 2 |
| | Antioxidant (TPPD) | 2.5 | 2.5 | 2.5 | 2.5 | 2.5 | 2.5 | 2.5 | 2.5 | 2.5 |
| | Zinc oxide | 2 | 2 | 2 | 2 | 2 | 2 | 2 | 2 | 2 |
| | Vulcanization accelerating agent (MBTS) | 0.6 | 0.6 | 0.6 | 0.6 | 0.6 | 0.6 | 0.6 | 0.6 | 0.6 |
| | Vulcanization accelerating agent (CBS) | 1.2 | 1.2 | 1.2 | 1.2 | 1.2 | 1.2 | 1.2 | 1.2 | 1.2 |
| | Sulfur | 1.3 | 1.3 | 1.3 | 1.3 | 1.3 | 1.3 | 1.1 | 1.1 | 1.1 |
| | Foaming agent (DNPT) | 2.5 | 2.5 | 2.5 | 2.5 | 2.5 | 2.5 | 2.5 | 2.5 | 2.5 |
| | Urea | 2.5 | 2.5 | 2.5 | 2.5 | 2.5 | 2.5 | 2.5 | 2.5 | 2.5 |
| | (a) Organic fiber[1)] | 1 | 1 | 1 | 1 | 1 | 1 | 1 | 1 | 1 |
| | (b) Fine particle-containing organic fiber[2)] | 1 | 1 | 1 | 1 | 1 | 1 | 1 | 1 | 1 |
| | (a)/(b) | | | | | 50/50 | | | | |
| | Aluminum hydroxide | 10 | 5 | 20 | 10 | 10 | 10 | 10 | | |
| | Pentonite | | | | | | | | 10 | 5 |
| Foaming rate performance | | 25 | ← | ← | ← | ← | ← | ← | ← | ← |
| | On-ice performance | 110 | 105 | 120 | 120 | 130 | 115 | 125 | 106 | 103 |
| | Wet skid performance | 110 | 108 | 120 | 130 | 100 | 115 | 135 | 106 | 105 |
| | Abrasion resistance | 97 | 98 | 96 | 97 | 97 | 100 | 96 | 96 | 97 |

TABLE 2

| | combination thing (mass part) | Comparative Example | | | | | | |
|---|---|---|---|---|---|---|---|---|
| | | 1 | 2 | 3 | 4 | 5 | 6 | 7 |
| combination | Natural rubber | 70 | 70 | 70 | 100 | 80 | 50 | 50 |
| | Cis-1,4-polybutadiene rubber | 30 | 30 | 30 | — | 20 | 50 | 50 |
| | Carbon black | 55 | 55 | 55 | 30 | 30 | 60 | — |
| | Silica | 5 | 5 | 5 | 30 | 30 | — | 60 |
| | Silane coupling agent | 0.5 | 0.5 | 0.5 | 3.0 | 3.0 | — | 6.0 |
| | Aroma oil | 15 | 15 | 15 | 15 | 15 | 15 | 15 |
| | Stearic acid | 2 | 2 | 2 | 2 | 2 | 2 | 2 |
| | Antioxidant (TPPD) | 2.5 | 2.5 | 2.5 | 2.5 | 2.5 | 2.5 | 2.5 |
| | Zinc oxide | 2 | 2 | 2 | 2 | 2 | 2 | 2 |
| | Vulcanization accelerating agent (MBTS) | 0.6 | 0.6 | 0.6 | 0.6 | 0.6 | 0.6 | 0.6 |
| | Vulcanization accelerating agent (CBS) | 1.2 | 1.2 | 1.2 | 1.2 | 1.2 | 1.2 | 1.2 |
| | Sulfur | 1.3 | 1.3 | 1.3 | 1.3 | 1.3 | 1.3 | 1.1 |
| | Foaming agent (DNPT) | 2.5 | 2.5 | 2.5 | 2.5 | 2.5 | 2.5 | 2.5 |
| | Urea | 2.5 | 2.5 | 2.5 | 2.5 | 2.5 | 2.5 | 2.5 |
| | (a) Organic fiber[1)] | 1 | 1 | 1 | 1 | 1 | 1 | 1 |
| | (b) Fine particle-containing organic fiber[2)] | 1 | 1 | 1 | 1 | 1 | 1 | 1 |
| | (a)/(b) | | | | 50/50 | | | |
| | Aluminum hydroxide | — | 4 | 25 | 10 | 10 | 10 | 10 |
| | Pentonite | | | | | | | |
| Foaming rate performance | | 25 | ← | ← | ← | ← | ← | ← |
| | On-ice performance | 100 | 100 | 115 | 95 | 98 | 90 | 105 |
| | Wet skid performance | 100 | 100 | 110 | 105 | 100 | 110 | 130 |
| | Abrasion resistance | 100 | 98 | 90 | 105 | 100 | 110 | 94 |

Fiber materials of 1) and 2): resin kind (PE polyethylene, melting point: 132° C.), fine particle content (mass parts): 15, fine particle average particle diameter (μm): 20, fiber diameter (μm): 32, fiber length (mm): 2

It can be found from the results shown in Tables 1 and 2 that the tires prepared in Examples 1 to 9 are average or higher in both of a WET performance and an on-ice performance. Further, it can be found from the results of Comparative Example 2 that the on-ice performance and the WET performance are not sufficiently improved only by adding 4 mass parts of the inorganic compound powder. It can be found from the results of Comparative Example 3 that addition of 25 mass parts of the inorganic compound powder makes it impossible to maintain the abrasion resistance. Further, it can be found from the results of Comparative Examples 4 to 7 that the inadequate blending amounts of natural rubber, cis-1,4-polybutadiene, carbon black and silica exert an effect on the on-ice performance and that the WET performance is not elevated so much.

INDUSTRIAL APPLICABILITY

The tire according to the present invention is a tire which is excellent in a WET performance, an on-ice performance and a workability and which has a very high industrial applicability.

What is claimed is:

1. A tire comprising a foamed rubber layer provided on a surface substantially brought into contact with a road surface, wherein the foamed rubber layer has a foaming rate falling in a range of 3 to 50%; at least natural rubber and polybutadiene are contained in a rubber component; natural rubber is contained in a range of 20 to 70 mass parts, and polybutadiene is contained in a range of 30 to 80 mass parts each per 100 mass parts of the rubber component; carbon black is contained in a range of 5 to 55 mass parts per 100 mass parts of the rubber component; silica is contained in a range of 5 to 55 mass parts per 100 mass parts of the rubber component; (a) organic fibers containing no fine particles and (b) fine particle-containing organic fibers containing fine particles are contained and the portion of (a)/(b) falls in a range of 95/5 to 5/95 wherein the organic fiber resin used for (a) the organic fibers and (b) the fine particle-containing organic fibers is molten until the rubber composition reaches a vulcanization maximum temperature; and at least one inorganic compound powder having a particle diameter of 10 μm or less represented by the following Formula (I) is contained in a range of 5 to 20 mass parts per 100 mass parts of the rubber component:

$$M \cdot xSiO_2 \cdot yH_2O \tag{I}$$

(M in Formula (I) is oxide or hydroxide of metal selected from Al, Mg, Ti and Ca, and x and y may be different from each other and are an integer of 0 to 10).

2. The tire as described in claim 1, wherein the inorganic compound powder represented by Formula (I) described above is an inorganic compound powder represented by the following Formula (II):

$$Al_2O_3 \cdot mSiO_2 \cdot nH_2O \tag{II}$$

(m in Formula (II) is an integer of 1 to 4, and n is an integer of 0 to 4).

3. The tire as described in claim 1, wherein the inorganic compound powder represented by Formula (I) described above is a powder comprising aluminum hydroxide.

4. The tire as described in claim 1, wherein (a) the organic fibers and (b) the fine particle-containing organic fibers are contained in a total amount falling in a range of 1 to 5 mass parts per 100 mass parts of the rubber component.

5. The tire as described in claim 1, wherein the fine particles are contained in (b) the fine particle-containing organic fibers in a range of 5 to 50 mass parts per 100 mass parts of the resin in the whole of the organic fibers.

6. The tire as described in claim 1, wherein the fine particles contained in (b) the fine particle-containing organic fibers have a Mohs hardness of 2 or more, fall in a range of 10 to 50 μm in 80 mass % or more of a frequency count in a particle diameter distribution and have an average particle diameter falling in a range of 10 to 30 μm.

7. The tire as described in claim 1, wherein fibers used for (a) the organic fibers and (b) the fine particle-containing organic fibers have a diameter falling in a range of 0.01 to 0.1 mm and a length falling in a range of 0.5 to 20 mm.

8. The tire as described in claim 1, wherein the fine particles contained in (b) the fine particle-containing organic fibers have a frequency count of 20 mass % or more in a peak value of a particle size distribution.

9. The tire as described in claim 1, wherein the fine particles contained in (b) the fine particles-containing organic fibers have an aspect ratio of 1.1 or more, and corner parts are present therein.

10. The tire as described in claim 1, wherein the fine particles contained in (b) the fine particle-containing organic fibers are selected from inorganic fine particles and organic fine particles.

11. The tire as described in claim 1, wherein a resin of the organic fibers is a crystalline polymer comprising at least one selected from polyethylene and polypropylene and has a melting point of 190° C. or lower.

* * * * *